US011449813B2

(12) United States Patent
Sebilleau et al.

(10) Patent No.: US 11,449,813 B2
(45) Date of Patent: Sep. 20, 2022

(54) GENERATING PROJECT DELIVERABLES USING OBJECTS OF A DATA MODEL

(71) Applicant: Accenture Global Solutions Limited, Dublin (IE)

(72) Inventors: Antoine Sebilleau, Neuilly sur Seine (FR); Pak Ming Wan, Paris (FR); Michel Etienne Liegard, Le Kremlin Bicêtre (FR)

(73) Assignee: Accenture Global Solutions Limited, Dublin (IE)

( * ) Notice: Subject to any disclaimer, the term of this patent is extended or adjusted under 35 U.S.C. 154(b) by 490 days.

(21) Appl. No.: 15/952,491

(22) Filed: Apr. 13, 2018

(65) Prior Publication Data

US 2019/0318285 A1     Oct. 17, 2019

(51) Int. Cl.
*G06Q 10/06*          (2012.01)
*G06F 3/04847*        (2022.01)

(52) U.S. Cl.
CPC ... *G06Q 10/06313* (2013.01); *G06Q 10/0633* (2013.01); *G06F 3/04847* (2013.01)

(58) Field of Classification Search
CPC ........... G06Q 10/06; G06Q 10/063114; G06Q 10/06313
USPC ....................................................... 705/7.27
See application file for complete search history.

(56) References Cited

U.S. PATENT DOCUMENTS

| | | | |
|---|---|---|---|
| 4,875,162 A | 10/1989 | Ferriter et al. | |
| 6,662,357 B1 | 12/2003 | Owman-Amuah | |
| 7,117,449 B1 | 10/2006 | Levin et al. | |
| 7,168,077 B2 | 1/2007 | Kim et al. | |

(Continued)

FOREIGN PATENT DOCUMENTS

| EP | 1699005 | 9/2006 |
|---|---|---|
| JP | H0916392 | 1/1997 |

(Continued)

OTHER PUBLICATIONS

EP European Search Report in European Application No. EP19166839, dated May 14, 2019, 7 pages.

(Continued)

*Primary Examiner* — Renae Feacher
(74) *Attorney, Agent, or Firm* — Fish & Richardson P.C.

(57) ABSTRACT

Methods, systems, and apparatus, including computer programs encoded on a computer storage medium, for receiving requirements data for a first enterprise resource planning (ERP) project and accessing a data repository that includes multiple templates. A subset of the templates include activity templates and each template is associated with at least one other ERP project. A system identifies activity templates based on the requirements data. Each identified activity template defines deliverables for performing the first ERP project. The system receives user input for validating an identified activity template by referencing the requirements data. The system selects an activity template in response to receiving the user input that validates the activity template. The system uses the selected activity template to generate a first deliverable for executing the first ERP project. The first deliverable is represented by a data object in the activity template that receives workflow data for execution of the first deliverable.

20 Claims, 6 Drawing Sheets

(56) References Cited

U.S. PATENT DOCUMENTS

| | | | |
|---|---|---|---|
| 7,703,071 B2 | 4/2010 | Kuester et al. | |
| 10,607,185 B2 | 3/2020 | Leitch et al. | |
| 2003/0097296 A1 | 5/2003 | Putt | |
| 2005/0021348 A1 | 1/2005 | Chan et al. | |
| 2006/0053043 A1 | 3/2006 | Clarke | |
| 2006/0111950 A1* | 5/2006 | Katircioglu | G06Q 20/108 705/70 |
| 2006/0129440 A1* | 6/2006 | Frauenhoffer | G06Q 10/0633 705/7.26 |
| 2006/0206368 A1 | 9/2006 | Bamberger et al. | |
| 2007/0276714 A1 | 11/2007 | Beringer | |
| 2008/0140490 A1 | 6/2008 | Wang et al. | |
| 2010/0305991 A1* | 12/2010 | Diao | G06Q 10/04 706/46 |
| 2011/0264591 A1 | 10/2011 | Song et al. | |
| 2012/0011079 A1* | 1/2012 | Kumaran | G06Q 10/067 705/348 |
| 2012/0296687 A1* | 11/2012 | Satyanarayana | G06Q 10/06312 705/7.22 |
| 2013/0014084 A1 | 1/2013 | Sahibzada et al. | |
| 2013/0117747 A1 | 5/2013 | Balko | |
| 2013/0154800 A1* | 6/2013 | Holmes | G06K 7/10366 235/375 |
| 2013/0159034 A1* | 6/2013 | Herter | G06Q 10/06 705/7.11 |
| 2013/0191302 A1* | 7/2013 | Leitch | G06Q 10/06 705/342 |
| 2015/0088569 A1 | 3/2015 | Fernandez | |
| 2016/0092347 A1* | 3/2016 | Edwards | G06F 11/3684 717/125 |
| 2017/0083292 A1 | 3/2017 | McLaughlan et al. | |

FOREIGN PATENT DOCUMENTS

| | | |
|---|---|---|
| JP | 2005044362 | 2/2005 |
| JP | 2005338968 | 12/2005 |
| JP | 2009003771 | 1/2009 |
| JP | 2013514597 | 4/2013 |
| WO | WO2011/075528 | 6/2011 |

OTHER PUBLICATIONS

JP Decision to Grant Patent in Japanese Application No. 2019-075882, dated May 19, 2020, 6 pages (with English Translation).

* cited by examiner

Activity Object: Define Object...    Activity Object Data Keys(s): Add Object Data Keys... ⟋432

| Object | Customer Sales Order | | Order Type | OR | |

Screen Steps +Add screen step... ✏ Edit Step... 🗑 Delete Step...

| Sequence | Action | Field | is Mandatory | Table | DB Field | Business Rule |
|---|---|---|---|---|---|---|
| 1 | Enter | Order Type | Y | VBAK | AUART | |
| 2 | Enter | Sales Organization | Y | VBAK | VKORG | |
| 3 | Enter | Distribution Channel | Y | VBAK | VTWEG | |
| 4 | Enter | Division | Y | VBAK | SPART | |
| 5 | Enter | Sold To party | Y | VBAK | KUNAG | |
| 6 | Enter | Ship To Party | Y | VBPA | KUNNR | |
| 7 | Enter | PO Number | Y | VBKD | BSTKD | |
| 8 | Enter | PO Date | Y | VBKD | BSTDK | |
| 9 | Enter | Complete div. | | VBAK | AUTLF | "Possible values are -"if client accepts partial deliveries, the client will be served with as many deliveries as it takes pending inventory availability. We will wait for all goods to be available before proceeding to shipment -"X" if client accepts only complete deliveries" |
| 10 | Enter | Payment Terms | Y | VBKD | ZTERM | Payment terms are defaulted from the Sold-to Party Master file "Possible Payment Terms: -"0001" "Payable Immediately due net -"0002" "Net days -"0003" "Net 60 Days" Enter alternate payment terms if needed |
| 11 | | | Y | VBKD | ZTERM | |
| 12 | | | | | | |

GENERATING PROJECT DELIVERABLES USING OBJECTS OF A DATA MODEL

FIELD

This specification relates to computing systems for executing a project.

BACKGROUND

Current methods for systems integration delivery involve defining deliverables and tasks that can be executed by teams. These methods generally use project artifacts that are documented in productivity software, such as document processing or spreadsheet programs, and manual tasks coordinated between team members to accomplish work associated with a project. Project teams can be quite large and team members are sometimes separated by capability, such as functional expertise, testing expertise, or configuration & development expertise. When a project begins, team members with relevant business, functional, and technical skills are often chosen to accelerate the initial execution of certain project milestones based on their expertise. In these instances, knowledge and details specific to the project's execution often stay with each individual and are not centrally shared for reference or use by other team members. Members of project teams may also be located in different geographic regions. When this occurs, valuable knowledge and execution data useful for improving execution of related projects tend to be functionally and geographically dispersed.

SUMMARY

This specification describes techniques for generating computer-based enterprise project deliverables based on activity templates stored in a data repository of a computing system. The computing system includes a data repository with a library of templates. All or some of the templates in the library can be created based on data collected by the system during execution of an earlier project. The templates can identify activities and project milestones that correspond to deliverables for executing a current project. Each template can include at least one data object that represents a deliverable to be completed in order to execute the current project. For example, a deliverable represented by a data object can include item procurements, project schedules and milestones, required payments, or a variety of other tasks associated with executing a project.

In some implementations, groups of templates stored in the data repository can be configured as activity templates for executing projects that align with particular industries or business processes. The computing system receives requirements data for instantiating an example enterprise resource planning (ERP) project. The computing system accesses the data repository to identify sets of activity templates based on the requirements data. The requirements data can indicate the particular industry or business process that aligns with a scope of the ERP project. For example, the requirements data can specify that the scope of the ERP project is to design and test a software application for performing a business process related to manufacturing an item.

Using this information, the system can identify templates that are associated with the requirements data and select a particular activity template that specifically aligns with the business process and ERP project scope defined by the requirements data. The selected activity template is used to generate one or more deliverables for executing the ERP project and each deliverable is represented by at least one data object. The data objects are configured to receive and store (e.g., temporarily store) workflow data about completion of certain project tasks and other activities that correspond to each deliverable of the ERP project.

One aspect of the subject matter described in this specification can be embodied in a computer-implemented method. The method includes receiving, at a computing system, requirements data for a first enterprise resource planning (ERP) project and accessing a data repository comprising a plurality of templates, wherein at least a subset of the templates include activity templates, and wherein each template of the plurality of templates is associated with at least one other ERP project. The method includes identifying, at the computing system and based on the requirements data, a subset of activity templates from among the plurality of templates stored at the data repository, wherein each activity template in the subset defines deliverables for performing the first ERP project; and receiving, at the computing system, user input for validating at least one activity template in the subset with reference to the requirements data received at the computing system. The method also includes, selecting, at the computing system, an activity template from the subset of activity templates in response to receiving the user input that validates the activity template; and generating, at the computing system and using the selected activity template, a first deliverable for executing the first ERP project, the first deliverable represented by at least one data object in the activity template, the at least one data object configured to receive workflow data for execution of the first deliverable.

These and other implementations can each optionally include one or more of the following features. For example, in some implementations, the selected activity template corresponds to a reference template in the data repository, and the method further includes: modifying, at the computing system, the reference template based on data obtained using a feedback loop, wherein the feedback loop is configured to adjust characteristics of the reference template using the received workflow data about execution of the first deliverable. In some implementations, the method further includes: generating, at the computing system and based on the modified reference template, a second deliverable for executing a second ERP project, wherein the modified reference template is used to generate the second deliverables in response to new user input validating selection of the modified reference template.

In some implementations, the user input that validates the activity template corresponds to a first value for assessing usability of the activity template in executing the first ERP project; the new user input validating selection of the modified reference template corresponds to a second value for assessing usability of the modified reference template in executing the second ERP project; and the second value is greater than the first value and indicates the modified reference template has enhanced usability relative to the usability of the selected activity template. In some implementations, the selected activity template includes multiple data objects and each data object is: identified by a unique identifier that links the data object to the reference template; and represents one or more activities or one or more tasks that are included in the first deliverable. In some implementations, adjusting characteristics of the reference template includes: accessing a data object of the reference template using at least the unique identifier; and adjusting data parameters that indicate one or more activities for executing a particular project.

In some implementations, the selected activity template includes a project identifier that is used to: link the selected activity template to the first ERP project; associate the received workflow data about execution of the first deliverable with the first ERP project; and associate the received workflow data about execution of the first deliverable with the multiple data objects included in the selected activity template. In some implementations, the method further includes: receiving user input for adjusting parameters of the requirements data; and automatically configuring the reference template to generate deliverables that define activities for executing a particular ERP project based on the received user input for adjusting the parameters of the requirements data.

In some implementations, the data repository includes a central database and a project database that interact to form a unified data model, and wherein: the central database is configured to store the plurality of templates and data objects for each template of the plurality of templates; and the project database is configured to access workflow data for adjusting characteristics of the plurality of templates based on communications exchanged with the central database. In some implementations, identifying the subset of activity templates comprises: determining that a request for accessing the data repository has been received by the computing system; deleting, from the templates, references to workflow data that is associated with data objects in templates at the data repository; and identifying the subset of activity templates using the templates for which references to workflow data have been deleted.

In some implementations, the selected activity template is a test script. In some implementations, the selected activity template is configured for modification based on the requirements data. In some implementations, the method further includes: modifying, at the computing system, the selected activity template based on the requirements data; and storing, in the data repository, a selected activity template that has been modified based on the requirements data. In some implementations, the multiple data objects of the selected activity template are dynamically linked to each other in the selected activity template; and at least one data object corresponds to one or more of a plurality of phases of the first ERP project. In some implementations, the plurality of phases of the first ERP project include at least one of: a planning phase, an analysis phase, a design phase, a build phase, a test phase, and a deploy phase.

Other implementations of this and other aspects include corresponding systems, apparatus, and computer programs, configured to perform the actions of the methods, encoded on computer storage devices. A computing system of one or more computers or hardware circuits can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The subject matter described in this specification can be implemented in particular implementations and can result in one or more of the following advantages. The described techniques enable a repeatable automated process for identifying and selecting activity templates in order to generate deliverables for executing an ERP project. A computing system uses a unified data model and a feedback loop that links project templates of the data model to reference templates of the data model. The feedback loop is configured to enhance usability of the reference templates based on data harvested during execution of a first ERP project. For example, usability of the reference template is enhanced when workflow data about execution of deliverables and activities in the first ERP project are fed back to reference templates of the data model. The system can automatically configure the reference template to generate a deliverable for executing a second ERP project using the workflow data that is fed back and based on the enhanced usability of the reference template.

The described techniques define a specific set of computer-implemented rules that, when executed, provide improvements in computing processes for generating project deliverables. For example, a centralized repository includes templates, objects, and data collected during execution of an earlier project. The system uses the computing rules to analyze requirements values against data in the repository in order to efficiently harvest information and generate deliverables for a current ERP project. In this manner, the computing rules can be used to eliminate or remove duplicative templates and other data from the repository. This removal of duplicative information translates to reductions in an amount of data stored in the repository thereby providing additional memory resources. In some implementations, the described computing systems allow for increased information security control relative to other systems. For example, documents and electronic files that are associated with project execution can be stored in a structured and centralized manner (as opposed to a more usual approach of storing files where deliverables are in e-mails or not securely stored on laptops, computers, etc.)

Further, the computing rules provide for more efficient identification of templates based on a configuration of the unified data model that links project templates to reference templates. These improvements in identifying data stored in the repository contribute to faster times for configuring activity templates, faster times for generating a deliverable to initiate execution of an ERP project, and more efficient replication and distribution of data representing the deliverable to individual computers used by members of a project team. The described techniques reduce (or eliminate) the likelihood of generating project deliverables using extraneous data that might not align with a user's requirements of a project. This can prevent creation of unnecessary project templates, which reduces the computational resources required to configure data objects for generating a deliverable for a project. As such, the described technology improves the efficiency of the computer system operation, which is an improvement to the computer system itself. Hence, operation of the system itself is improved by providing more efficient processes for controlling how data is accessed and processed to generate deliverables for an ERP project.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
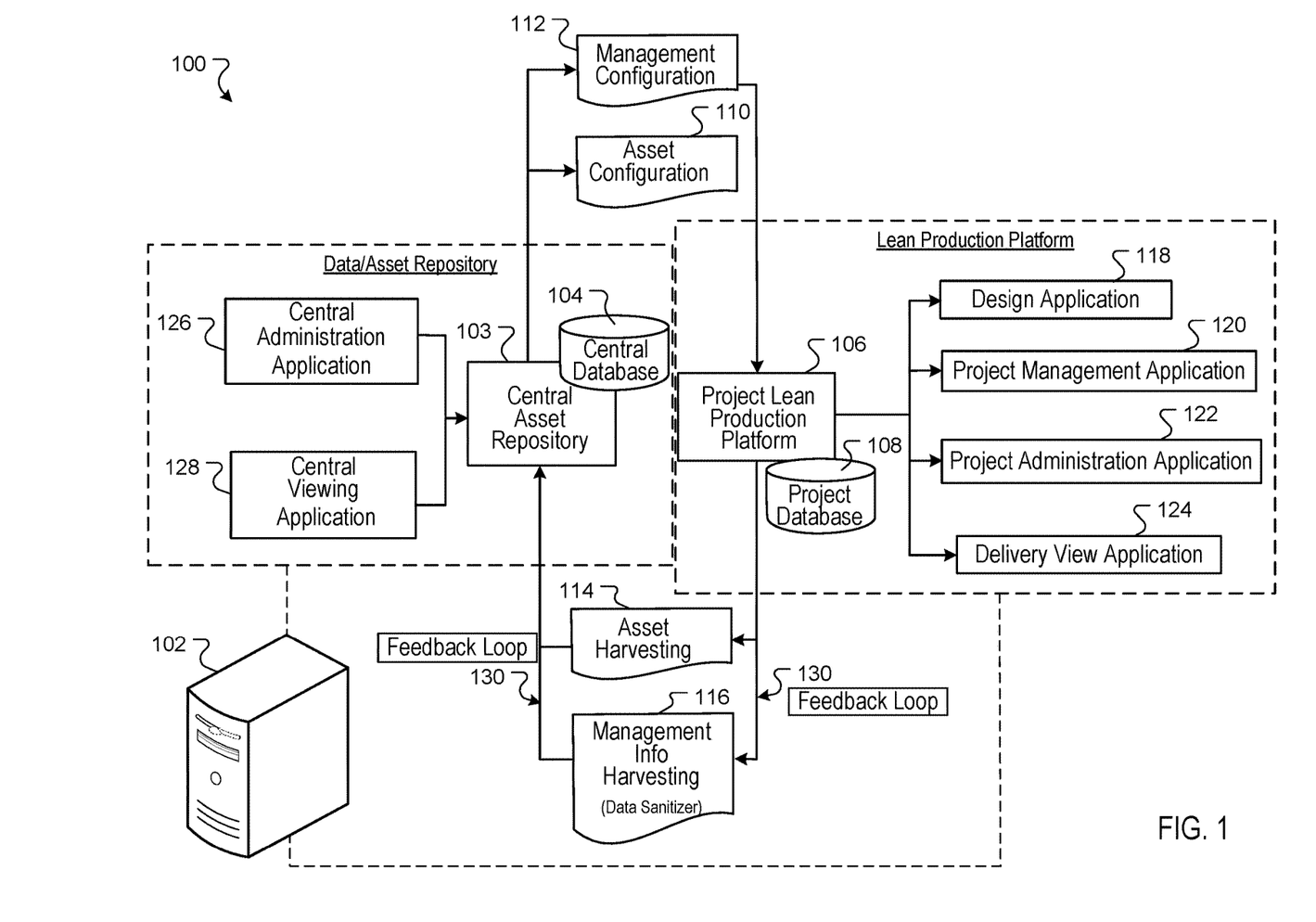
FIG. 1 shows a computing system that provides activity templates for executing a project.

FIG. 1 shows a computing system 100 that provides activity templates for executing an ERP project. System 100 can be included in an example data processing platform configured for generating various systems, applications, and products that include computing assets for executing projects relating to different types of business processes. For example, system 100 can be used to develop Customer Relationship Management (CRM) computing assets, such as marketing software programs. In some implementations, the software program generates a template outlining activities and tasks that are used by a business entity to plan, execute, and manage their marketing campaigns.

In this context, a computing server 102 of system 100 includes generally multiple computing modules and data storage devices. In particular, server 102 includes a data repository 103 that hosts a central database 104 (described below). Server 102 also includes a production platform 106 that hosts a project database 108 (described below). In some implementations, each of data repository 103 and production platform 106 is included within server 102 as a sub-system of hardware circuits (e.g., special-purpose hardware circuitry) that includes two or more processor microchips. In general, server 102 can include processors (e.g., CPU and GPU), memory, and data storage devices 106 that collectively form computer systems of server 102.

Processors of these computer systems process instructions for execution by server 102, including instructions stored in the memory or on the data storage device 106 to display graphical information for output at an example display monitor of system 100. In some implementations, execution of the stored instructions cause one or more of the actions described herein to be performed by server 102 or other resources of system 100. In other implementations, server 102 uses multiple processors, as appropriate, along with multiple memories and types of memory. For example, server 102 may be connected with multiple other computing devices, with each device (e.g., a server bank, groups of servers, modules, or a multi-processor system) performing portions of the actions, operations, or logical flows described in this specification.

Data repository 103 is a central storage device or central asset repository configured to store and provide access to a variety of digital assets or templates. Templates stored in the data repository can be configured as activity templates for executing projects that align with particular industries or business processes. For example, data repository 103 can store multiple activity templates, where each activity template is configured to include multiple digital assets. In some implementations, each digital asset corresponds to a respective data object that receives information from a user that accesses a particular activity template.

As used in this document, a "digital asset" represents a discrete unit of digital content or digital information (e.g., text data, electronic documents, data structures, electronic files, audio data, multimedia content, image data, or another unit of content). A digital asset can electronically be stored in a physical memory device as a single file or in a collection of files, and digital assets can take the form of application files, data arrays, video files, audio files, multimedia files, image files, text files, or data objects such that a data object is a type of digital asset. Similarly, "data object" can refer to a portion of a digital asset that is embedded into an electronic document or another application file. Data objects are described in more detail below at least with reference to FIG. 4A.

In general, each template of data repository 103 includes at least one data object that can represent a deliverable to be completed in order to execute a current project. As used in this document, an activity template includes, or identifies, activities and discrete milestones that correspond to deliverables for executing a current project. Further, one or multiple data objects can represent a single a deliverable of multiple deliverables. For example, a deliverable represented by a data object can include item procurements, project schedules and milestones, required payments, or a variety of other tasks associated with executing a project. In some implementations, two or more deliverables can form a set (or sets) of deliverables for executing the current project.

Central database 104 is configured as a storage location that receives and stores metadata associated with a particular project. The metadata can include project specific data and other information that may describe or define the scope of a project, team members assigned to the project, a client(s) that owns the project. Metadata can also include sensitive or proprietary data about business processes or computing resources relating to the client that owns the project. In some implementations, central database 104 is configured to remove, delete, or otherwise sanitize asset repository 103 of sensitive or proprietary metadata.

For example, central database 104 can analyze project deliverables relating to data objects or other digital assets of an activity template to detect sensitive or proprietary data. After detecting or determining that a template includes sensitive or proprietary data, central database 104 deletes the sensitive data and/or removes any metadata references or links to proprietary information. In response to sanitizing the metadata, central database 104 stores the sanitized metadata at a memory resource of the database. In some implementations, system 100 uses sanitized metadata relating to a completed ERP project to update baseline digital assets and sets of reference templates (described below) stored at central database 104.

In some instances, use of the sanitized metadata provides an improvement to computer operations. For example, removing or deleting sensitive or proprietary information produces a sanitized datasets that has a reduced data size relative to metadata that has not been sanitized. In view of this, sanitized data can require less memory resources for storage based on the reduced data size. Likewise, sanitized data can result in less or fewer processor resources when computing memory address locations for data retrieval and transfer functions. Hence, use of the sanitized metadata provides an improvement to computer operations when additional memory and processor resources are available for other system functions.

Central administration application 126 can represent a resource such as a computing module or application program for obtaining or ingesting electronic data and digital assets of a current or past ERP project. Application 126 configures exports of digital assets for designing and generating an activity template for a project. In some implementations, application 126 is configured to perform centralized project and asset reporting and to provide metrics and other information relating to project execution. Central viewing application 128 can be a computing module or application program that provides a graphical interface that is used to execute one or more functions of application 126. For example, users can review and evaluate assets that are stored in central asset repository 103, including templates and other resources of central database 104. In some implementations, application 128 provides real-time, or near real-time, updates when system 100 receives data describing new digital assets or workflow data about execution or completion of project tasks.

Production platform 106 is a project production platform for executing techniques to generate computer-based enterprise project deliverables. In general, production platform 106 provides computer-aided design tools that enhance overall execution of an ERP project (described below). The design tools are leveraged by users (e.g., consultants) to implement efficient (e.g., lean) computer-based production methods that can reduce reliance on manual documentation and enhance information sharing and collaboration during execution of an ERP project.

Project database 108 is a secure database that stores information about project deliverables (including data objects), project and template design information, electronic attachments, and other related design or execution material relating to an example ERP project. Project database 108 stores and provides access to project deliverables that are generated based on activity templates selected from data repository 103. Specifically, database 108 stores and provides access to a variety of digital assets (e.g., data objects) that represent each of the project deliverables and that are also included a part of the selected activity template.

Server 102 further includes a design application 118, a project management application 120, a project administration application 122, and a delivery view application 124. Design application 118 can represent a resource such as a computing module or application program for configuring activity templates based on requirements data or other user input. In some implementations, application 118 generates a graphical interface that enables viewing and browsing of templates stored at project database 108. For example, a user can browse available templates obtained from data repository 103 to define process and activities that match or align with a client's business process.

The users can employ features of application 118 to generate deliverables that are within the scope of a current ERP project that will be executed. In some implementations, system 100 identifies available templates as being within the scope of the current ERP project based on analysis of the requirements data. Each of the available templates includes processes and/or activities that are relevant to designing and generating a deliverable for executing the ERP project. In some implementations, each data object that corresponds to an activity of the eventual deliverable is configured for modification during at least one of a design phase or a planning phase of an ERP project. Data objects can correspond to one or more of multiple phases of an ERP project. In some implementations, phases of an ERP project include at least one of: a planning phase, an analysis phase, a design phase, a build phase, a test phase, and a deploy phase.

Design application 118 provides access to digital assets such as data objects, electronic documents, or program code stored at project database 108. In some implementations, application 118 is configured to automatically identify one or more templates based on the requirements data. For example, application 118 can analyze parameter values or terms included in the requirements data to identify at least one activity template that is presented as a suggestion to the user. The suggested activity template can be configured for modification by the user in order to generate a deliverable having project activities that align (e.g., substantially aligns) with a client's business needs. In other implementations, a user interacts with design application 118 to manually design and generate an activity template having a deliverable(s) for executing the current ERP project.

Project management application 120 is a computing module or application program that controls or adjusts information describing a project's status, such as overall progress of the project and existing (or prospective) issues that might arise during execution of the project. Management application 120 can generate a graphical interface for executing functions such as managing activities and tasks of an ERP project, for configuring a workflow that enables validation of data selections for executing an activity of the project, and for tracking progress of multiple activities that define a deliverable. For example, the graphical interface enables a user (e.g., a project manager) to view the status of an ERP project as well as managing execution of the functions described above.

Project administration application 122 is a computing module or application program that performs various tasks that relate to administration of an ERP project. For example, administration application 122 is configured to control access to various project datasets, client specific information (e.g., sensitive or proprietary information), and different applications of production platform 106. For example, application 122 can provision data access permissions, adjust file access authorizations, and assign controls for user access to the different applications of production platform 106. Project administration application 122 also controls access to referential data about business processes that are specific to a client, imports and exports data about digital assets relating to deliverables of an ERP project, and performs various backup and restore functions for maintaining access to project specific datasets stored at project database 108. In some implementations, application 122 generates a graphical interface that enables a project administrator to perform the above describe tasks that relate to administration of an ERP project.

Delivery view application 124 is configured to provide a graphical interface to a user that enables the user to view deliverables and validate one or more design options generated using system 100. For example, application 124 receives user input that indicates approval of a suggested design for an activity template or an example process or activity flow for executing an example ERP project. In some implementations, application 124 receives a digital signature that indicates user approval or validation of a selected activity template. In response to receiving a digital signature at application 124, production platform 106 records or otherwise stores data representing the digital signature in a memory resource of the platform. Receiving and storing a digital signature can indicate completion of design work and validation of a deliverable or set of deliverables generated based on a selected activity template.

Server 102 further includes process configuration modules 110, 112 and harvesting modules 114, 116. Each of configuration modules 110 and 112 interact to access and identify templates of data repository 103 against requirements data received at system 100. In some implementations, module 110 retrieves and configures digital assets, such as data objects, based on parameter values of the requirements data, while module 112 configures and assigns client specific information to each of the retrieved data objects. For example, modules 110, 112 interact to retrieve a data object for a project schedule. Modules 110, 112 can then associate the data object with a management process and configure the data object to define a project timeline (e.g., September 2017 through October 2018) based on schedule parameters of the requirements data.

Each of harvesting modules 114 and 116 interact to provide a feedback loop 130 configured to update baseline digital assets and sets of reference templates that are stored at data repository 103. In some implementations, modules 114 identifies and extracts workflow data and/or other information about execution of a project deliverable, while module 116 sanitizes the data and accesses data repository 103 to cause updates to asset baselines that form reference templates stored at central database 104. For example, modules 114, 116 interact to extract workflow data describing project schedule status and completion progress of different tasks. The data may indicate that several tasks of an ERP project managed by personnel X at client/business entity Y completed ahead of schedule. Module 116 removes sensitive information revealing the identity of personnel X or identifying the name of client/business entity Y. Modules 114, 116 uses a feedback loop 130 access data repository 103 to cause updates to baseline information about digital assets and other data objects of a reference template stored at central database 104.

As used in this specification, the term "module" includes, but is not limited to, one or more computers configured to execute one or more software programs that include program code that causes a processing unit(s) of the computer to execute one or more functions. The term "computer" includes any data processing device, such as a desktop computer, a laptop computer, a mainframe computer, a personal digital assistant, a server, a handheld device, or any other device able to process data.

Figure 2:
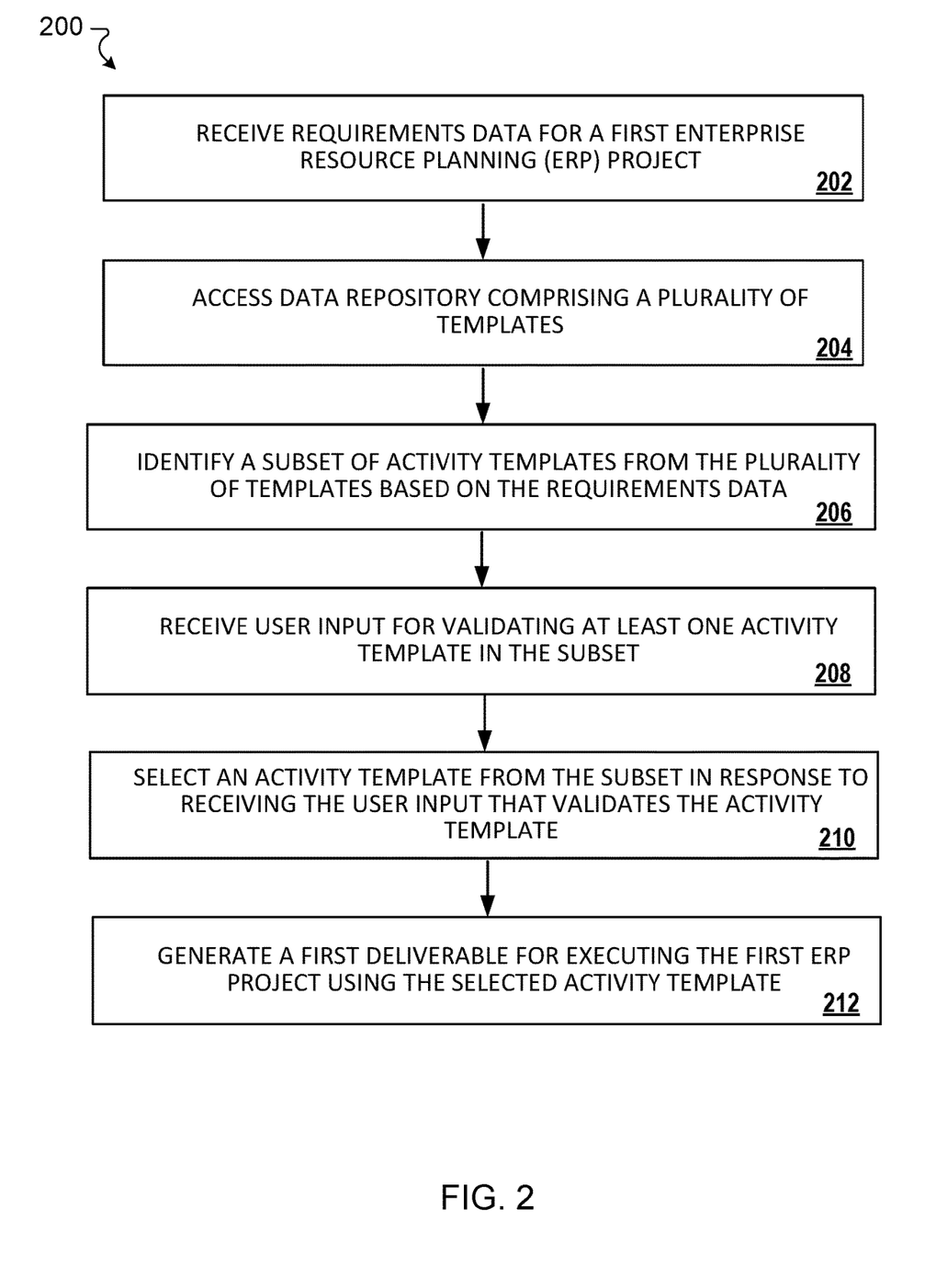
FIG. 2 shows an example process for generating deliverables for executing a project based on an activity template.

FIG. 2 shows an example process 200 for generating deliverables for executing an example ERP project based on an activity template. Process 200 can be implemented or executed using system 100 described above and descriptions of process 200 may reference the above-mentioned computing resources of system 100. In some implementations, described actions of process 200 are enabled by programmed firmware or software instructions that are executable by at least one processor and memory of computing systems described in this document.

System 100 receives requirements data for a first enterprise resource planning (ERP) project (202). For example, design application 118 receives requirements data based on input data provided by users that interact with production platform 106 using a graphical interface generated by application 118. The requirements data can include parameter values that identify a variety of information about an ERP project. For example, the requirements data can indicate the particular industry or business process that aligns with a scope of the ERP project. The requirements data can also specify that the scope of the ERP project is to design and test a software application for performing a business process related to manufacturing a widget. As discussed above, at least a subset of the templates that are accessible via central database 104 include activity templates.

In addition to activity templates, data repository 103 (or central database 104) can include a variety of other types of templates, such as templates for generating process flows that are executable by a processor/processing unit of system 100. For example, a template can represent an example test script that is accessed and configured to test or verify performance of certain software processes. In some implementations, the test script defines computing sequences that are executable by the processing unit to validate functionality of a software program used to perform a business process. For example, the test script can be executed to validate functionality of a software for processing customer payments, generating orders for item procurements, or for manufacturing a widget.

A computing resource of system 100 accesses a data repository that includes multiple templates (204). For example, design application 118 uses modules 110, 112 to access a database of templates associated with central database 104. In some implementations, accessing the templates includes filtering a portion of the templates against the requirements data. For example, module 110 can execute a filtering function that references the requirements to access particular types of templates from among the multiple different types of templates stored data repository 103. In this manner, by filtering templates against the requirements data, system 100 efficiently accesses only the most relevant templates by excluding certain other templates that do not align with a business scope of an ERP project.

System 100 identifies a subset of activity templates based on the requirements data (206). The subset of activity templates are identified from among the multiple templates stored at data repository 103. For example, design application 118 analyzes parameter values or terms included in the requirements data to identify (e.g., automatically identify) at least one activity template that is presented as a suggestion to the user. The activity template includes digital assets and data objects for generating deliverables used to perform or execute the first ERP project. System 100 identifies the templates in response to design application 118 analyzing parameter values or terms included in the requirements data. Design application 118 can determine a matching between project identifiers or descriptive terms in the requirements data and information (e.g., coded descriptor) stored at data repository 103 that describes activity templates and data objects included in the activity templates. Based on the determined matching, design application 118 identifies at least one activity template and uses modules 110, 112, to obtain data for presenting the activity template as a suggestion to a user.

For example, activity templates of central database 104 may be coded using descriptors that indicate assets or data objects of the template represent test scripts for validating software processes. Some activity templates may be further coded as having validation test scripts for testing software processes used in manufacturing widgets. Design application 118 determines a matching between identifiers or terms in the requirements data and the coded descriptors of the activity template. Based on the determined matching, design application 118 identifies at least one activity template that includes scripts for testing and validating a manufacturing software process. In response to determining the matching, design application 118 can obtain data for presenting the activity template as a suggestion to a user.

A computing resource of system 100 receives user input for validating at least one activity template in the subset with reference to the requirements data received at the computing system (208). For example, design application 118 and delivery view application 124 interact to presents an activity template that includes the validation test scripts for testing software processes as a suggestion to the user. System 100 receives user input indicating approval or validation of the template suggestion. For example, delivery view application 124 receives user input that indicates approval of a suggested design for an activity template for executing the ERP project. In some implementations, delivery view application 124 also receives a digital signature that indicates user approval or validation of a selected activity template.

Alternatively, the user can modify data objects or assets of the suggested activity template based on changes to the requirements data. In some implementations, the user modifies the suggested activity template based on user input received at system 100 for manually adjusting data objects of the template. The user input manually adjusts the data objects by adding or modifying an object data key(s) of the data objects. For example, an object data key may identify the validation test scripts as being configured for testing software processes of an order entry system. In this context, another object data key can be used to obtain data objects for validation test scripts configured to test software processes for manufacturing widgets. System 100 receives user input indicating approval or validation of the suggested activity template that was manually adjusted by the user. System 100 stores the selected activity template that has been modified (e.g., manually) based on user input that adjust a data object or based on changes to the requirements data.

System 100 selects an activity template from the subset of activity templates in response to receiving user input that validates the activity template with reference to the requirements data (210). The selected activity template can include multiple data objects that correspond to project tasks or activities for a deliverable. System 100 generates a first deliverable for executing the first ERP project using the selected activity template (212). The first deliverable is represented by at least one data object in the activity template. The at least one data object is configured to receive workflow data relating to execution of the first deliverable.

In some implementations, a deliverable corresponds to a process diagram describing implementation of the process as activities or tasks. Data objects of the deliverables indicate activities executed using at least system 100 (or using an external system and manual tasks). Data objects of the deliverable are linked (e.g., using application 118) to other data objects of the deliverable to form decision/branch points of the process diagram. For example, a data object that receives data for placing an order for a widget can be linked to another data object that tracks order processing and shipment status of the widget identified in the order.

Figure 3:
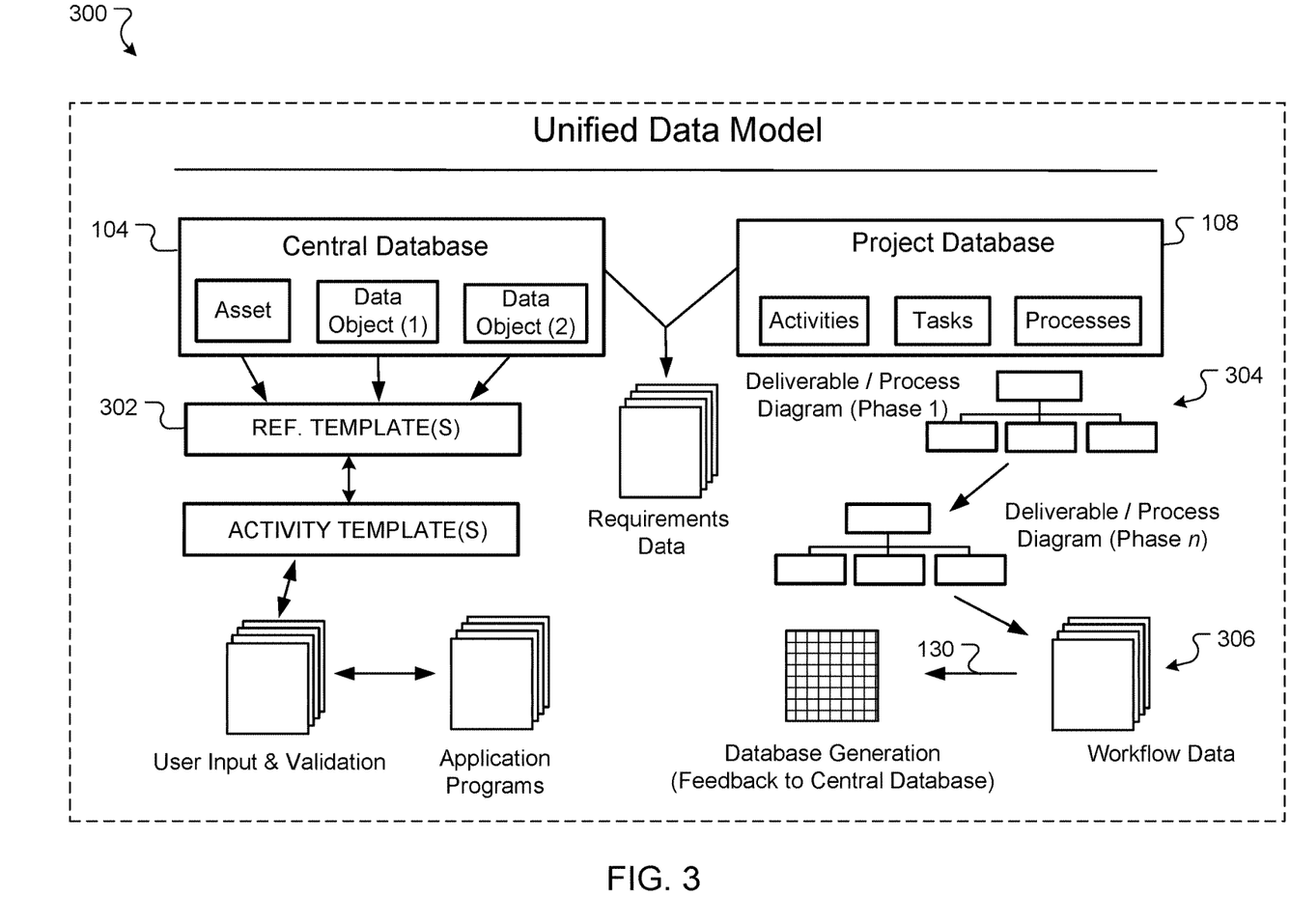
FIG. 3 shows a graphical representation of a data model accessible at the computing system of FIG. 1.

FIG. 3 shows a graphical representation of a data model 300 (e.g., a unified data model) of system 100. In some implementations, central database 104 and project database 108 are configured to be stored in a unified data model that corresponds to data model 300. As discussed above, the selected activity template includes multiple data objects that correspond to project tasks or activities for a deliverable 304. System 100 stores the selected activity template at the project database 108 and causes changes made to the selected activity template to be fed back to a corresponding reference template 302 stored at central database 104. In some implementations, based on the configuration of the unified data model, changes made to data objects or design elements of templates (e.g., project templates) stored at project database 108 are reflected in a corresponding reference template 302 stored at central database 104.

For example, within the unified data model, each data object of the selected activity template is: i) identified by a unique identifier that links the data object to a reference template 302 stored at data repository 103; and ii) represents one or more activities or project tasks that are included in the first deliverable. Hence, the selected activity template links back to reference template 302 in central database 104 of data repository 103. System 100 modifies the reference template 302 based on data obtained using feedback loop 130 (described above). The feedback loop 130 is configured to adjust characteristics of reference template 302 using the received workflow data 306 about execution of the first deliverable. In some implementations, adjusting characteristics of the reference template includes: i) accessing a data object of the reference template using at least the unique identifier; and ii) adjusting data parameters that indicate one or more activities for executing a particular ERP project.

System 100 is configured to generate a second deliverable for executing a second ERP project based on the modified reference template. In some implementations, the modified reference template is used to generate the second deliverables in response to new user input that validates selection of the modified reference template. The user input that validated the selected activity template corresponds to a first value for assessing usability of the selected activity template in executing a first ERP project. In this context, the new user input validating selection of the modified reference template corresponds to a second value for assessing usability of the modified reference template in executing a second ERP project. In some implementations, the second value is greater than the first value which indicates the modified reference template has enhanced usability relative to a usability of the initial selected activity template.

The selected activity template includes a project identifier that is used to link the selected activity template to the ERP project. The project identifier associates received workflow 306 data about execution of the first deliverable with the ERP project. Further, the project identifier also associates the received workflow 306 data about execution of the first deliverable with the multiple data objects included in the selected activity template. In some implementations, data model 300 is configured to reflect certain changes in design characteristics for all other templates included in the unified data model. Data model 300 enables dynamic adjustments to delivery of a template to a user and template adjustments for supporting a variety of different types of ERP projects.

Figure 4A:
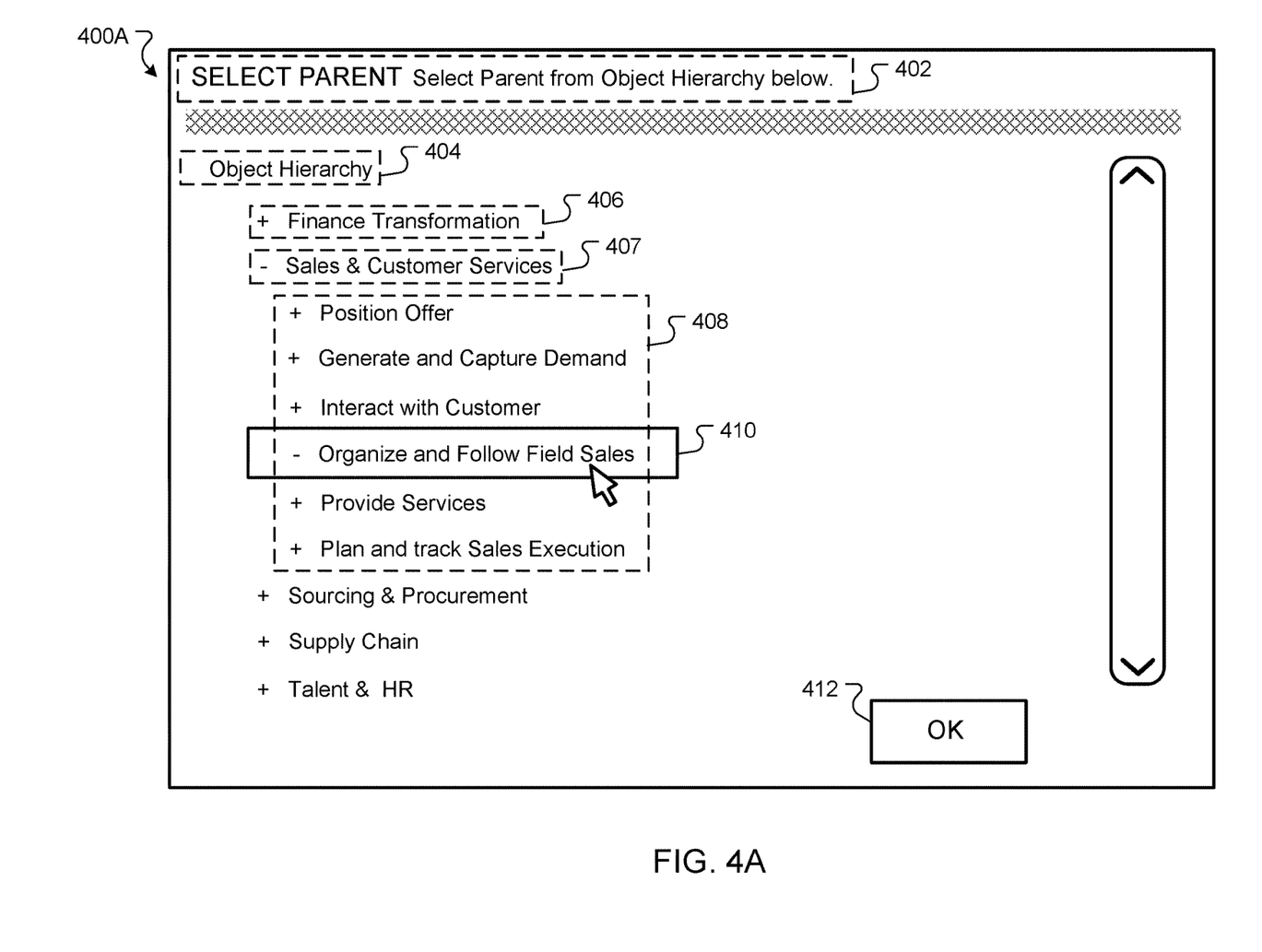
FIGS. 4A and 4B each show example graphical interfaces for interacting with the computing system of FIG. 1.
Figure 4B:
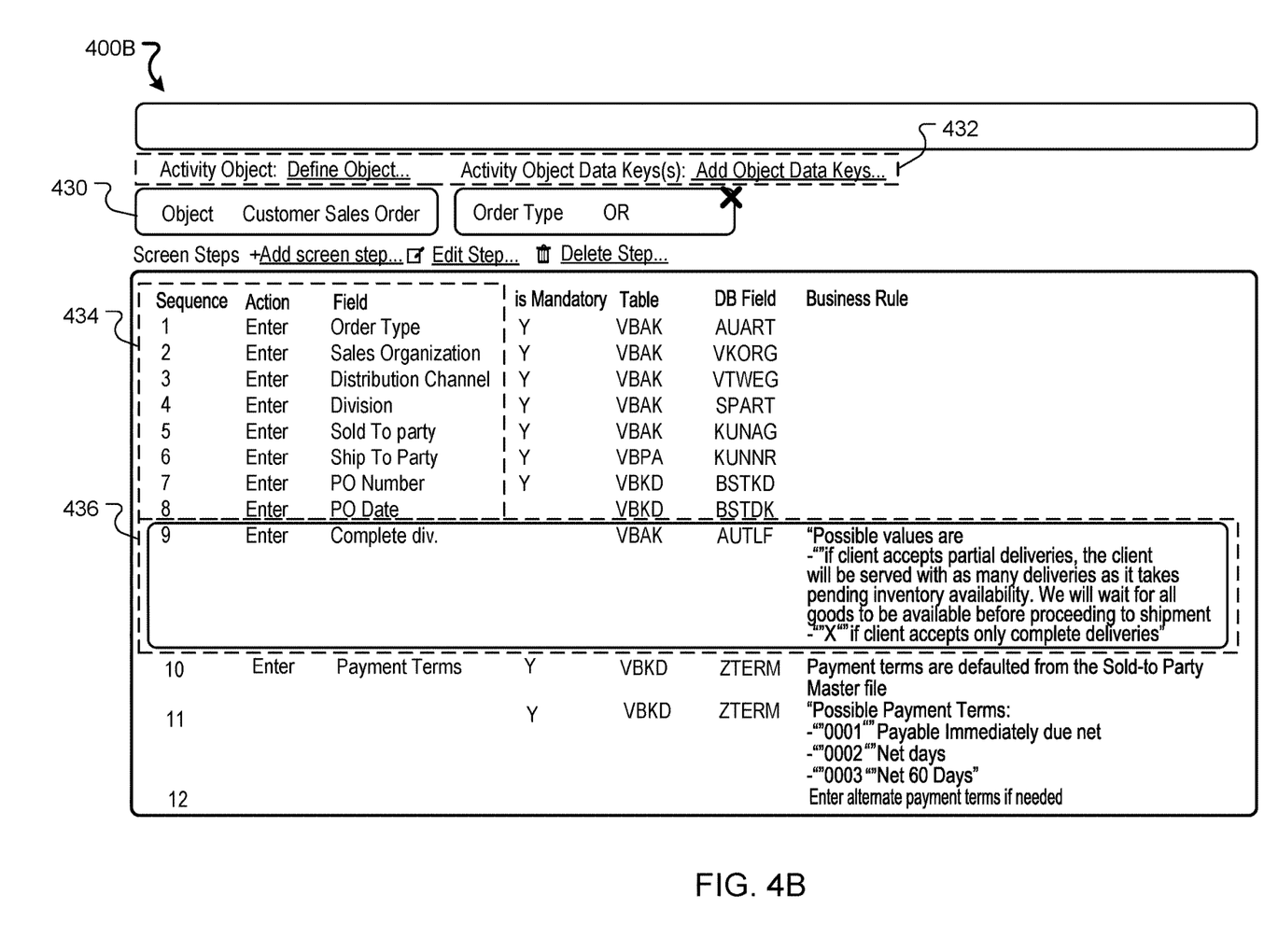

FIGS. 4A and 4B each show example graphical interfaces 400A and 400B for interacting with the various application programs and modules of system 100. Referring to FIG. 4A, interface 400A shows graphical representations for an example interface generated using an application of production platform 106 (e.g., design application 118 or delivery view application 124). Interface 400A generally includes textual and/or graphical representations of an object hierarchy 404, a first data object 406, a second data object 407, sub-objects 408, or a combination of these. In some implementations, interface 400A corresponds to a digital asset for arranging and configuring hierarchical relationships among data objects included in a template (e.g., an activity template). Further, the reference features (404, 406, 407, etc.) included at interface 400A represent data objects of the digital asset that corresponds to interface 400A.

In general, interface 400A can be used to configure activity templates based on requirements data or other user input. Interface 400A allows for viewing, browsing, selecting, and modifying of templates and data objects stored at central database 104 (or project database 108). In some implementations, a user interacts with interface 400A to design and generate an activity template that includes a deliverable for executing the current ERP project. For example, a user can modify a suggested activity template by browsing and selecting a particular data object for inclusion in the template. Designing and generating an activity template can include at least one of: i) selecting an activity template determined (or suggested) by system 100; ii) modifying an activity template determined (or suggested) by system 100; or iii) manually creating an activity template. In some implementations, system 100 modifies an activity template or manually creates an activity template based on reference data linked within object hierarchy 404.

For example, object hierarchy 404 provides access to datasets for selecting reference objects of other templates stored at data repository 103. In some implementations, object hierarchy 404 is an interface function that enables linking two or more data objects for integration in an activity template. For example, an activity template that defines a deliverable can include first data object 406 for a finance transformation task and second data object 407 for customer sales orders. The first data object 406 links to the second data object 407 so that a task for transforming processing of financial data for sales orders links to the various sales and customer service orders for which financial data is being received. In some implementations, in order to generate a deliverable, interface 400A is used to pass or transfer data for linked sub-objects 408 (and data for a selected object 410) between different graphical interfaces of an application.

Referring now to FIG. 4B, interface 400B shows graphical representations for an example interface generated using an application of production platform 106 (e.g., project management application 120). Interface 400B generally includes an asset selector 430, an object modifier 432, activity data 434, and workflow data 436. In general, interface 400B can be used to control or adjust information describing the status of an ERP project and to manage activities and tasks of an ERP project. Asset selector 430 allows for selection of a particular digital asset of a template or a deliverable. In some implementations, asset selector 430 is used to select an asset that corresponds to a "customer sales order" and to view or adjust activity data 434 and workflow data 436 relating to execution, or status, of sales orders for one or more customers.

Object modifier 432 allows for control and adjustment of data objects (e.g., activity objects) included in a template or deliverable. In some implementations, object modifier 432 is used to define a new data object that can be included as an activity of an activity template or deliverable. In some instances, object modifier 432 is used to add object data keys to a new or existing activity template. In some implementations, interface 400B is used to configure a workflow for validating data selections indicating execution of an activity of the ERP project as well as to monitor progress of multiple activities that define a deliverable.

Figure 5:
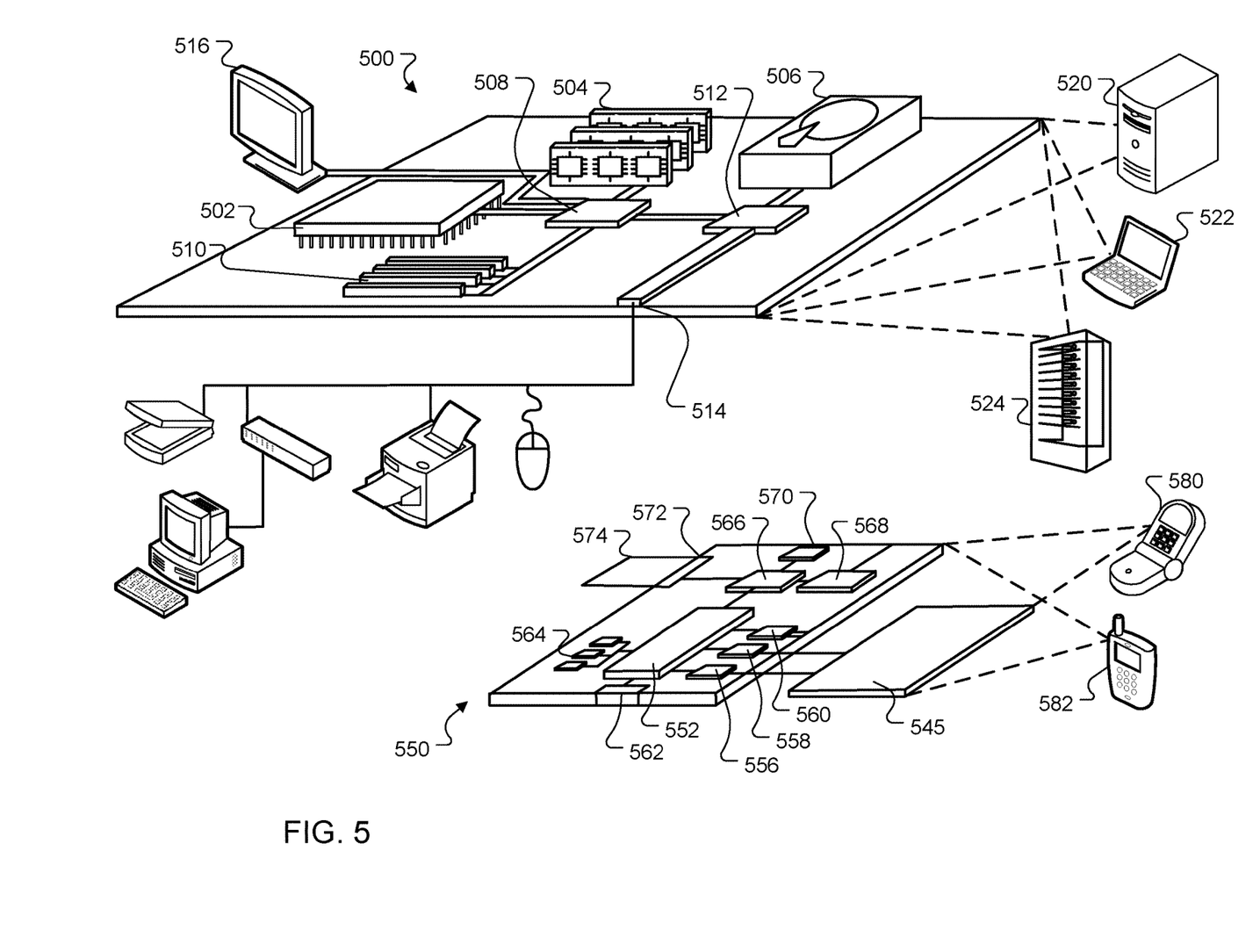
FIG. 5 shows a block diagram of a computing system that can be used in connection with computer-implemented methods described in this specification.

FIG. 5 shows a block diagram of a computing system that can be used in connection with computer-implemented methods described in this specification. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations, e.g., as a server bank, a group of blade servers, or a multi-processor system.

The memory 504 stores information within the computing device 500. In one implementation, the memory 504 is a computer-readable medium. In one implementation, the memory 504 is a volatile memory unit or units. In another implementation, the memory 504 is a non-volatile memory unit or units.

The storage device 506 is capable of providing mass storage for the computing device 500. In one implementation, the storage device 506 is a computer-readable medium. In various different implementations, the storage device 506 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 504, the storage device 506, or memory on processor 502.

The high-speed controller 508 manages bandwidth-intensive operations for the computing device 500, while the low speed controller 512 manages lower bandwidth-intensive operations. Such allocation of duties is exemplary only. In one implementation, the high-speed controller 508 is coupled to memory 504, display 516, e.g., through a graphics processor or accelerator, and to high-speed expansion ports 510, which may accept various expansion cards (not shown). In the implementation, low-speed controller 512 is coupled to storage device 506 and low-speed expansion port 514. The low-speed expansion port, which may include various communication ports, e.g., USB, Bluetooth, Ethernet, wireless Ethernet, may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can process instructions for execution within the computing device 550, including instructions stored in the memory 564. The processor may also include separate analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD display or an OLED display, or other appropriate display technology. The display interface 556 may include appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication, e.g., via a docking procedure, or for wireless communication, e.g., via Bluetooth or other such technologies.

The memory 564 stores information within the computing device 550. In one implementation, the memory 564 is a computer-readable medium. In one implementation, the memory 564 is a volatile memory unit or units. In another implementation, the memory 564 is a non-volatile memory unit or units. Expansion memory 574 may also be provided and connected to device 550 through expansion interface 572, which may include, for example, a SIMM card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provided as a security module for device 550, and may be programmed with instructions that permit secure use of device 550. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS receiver module 570 may provide additional wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound, e.g., voice messages, music files, etc., and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs, computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back-end component, e.g., as a data server, or that includes a middleware component such as an application server, or that includes a front-end component such as a client computer having a graphical user interface or a Web browser through which a user can interact with an implementation of the systems and techniques described here, or any combination of such back-end, middleware, or front-end components. The components of the system can be interconnected by any form or medium of digital data communication such as, a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In addition, certain data may be treated in one or more ways before it is stored or used, so that personally identifiable information is removed. For example, in some embodiments, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

A number of embodiments have been described. Nevertheless, it will be understood that various modifications may be made without departing from the spirit and scope of the invention. Accordingly, other embodiments are within the scope of the following claims. While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment.

Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, some processes depicted in the accompanying figures do not necessarily require the particular order shown, or sequential order, to achieve desirable results.

The invention claimed is:

1. A computer-implemented method comprising:
receiving, at a production platform of a system, requirements data for a first enterprise resource planning (ERP) project;
identifying, based on the requirements data, a plurality of activity templates stored in an asset repository that obtains project feedback output from the production platform, wherein each activity template of the plurality of activity templates includes at least one data object, each data object being linked to a reference template stored in the asset repository;
selecting an activity template from the plurality of activity templates based on input that validates use of the selected activity template to execute activities corresponding to deliverables of the first ERP project;
generating, using the production platform and the selected activity template, a first deliverable for performing the first ERP project;
generating, by the production platform during performance of the first ERP project, workflow data for at least one data object included in the selected activity template, the workflow data comprising feedback about execution of activities corresponding to the first deliverable;
generating modified reference templates by modifying, at the asset repository, characteristics of at least one reference template based on the workflow data generated for the at least one data object included in the selected activity template; and
using one or more of the modified reference templates to generate a second deliverable for performing a second ERP project.

2. The method of claim 1, further comprising:
generating, at the production platform and based on the one or more of the modified reference templates, the second deliverable for executing the second ERP project in response to new input validating selection of the one or more modified reference templates.

3. The method of claim 2, wherein:
the input that validates the selected activity template corresponds to a first value for assessing usability of the selected activity template in executing the first ERP project;
the new input validating selection of the one or more modified reference templates corresponds to a second value for assessing usability of the one or more modified reference templates in executing the second ERP project; and
the second value is greater than the first value and indicates the one or more modified reference templates has enhanced usability relative to the usability of the selected activity template.

4. The method of claim 1, wherein each data object of the selected activity template is:
identified by a unique identifier that links the data object to the reference template; and
represents one or more activities or one or more tasks that are included in the first deliverable.

5. The method of claim 4, wherein adjusting characteristics of the at least one reference template includes:
accessing a data object of the reference template using at least the unique identifier; and adjusting data parameters of the data object that indicate one or more activities for executing a particular project.

6. The method of claim 1, wherein the selected activity template includes a project identifier that is used to:
link the selected activity template to the first ERP project;
associate workflow data about execution of the first deliverable with the first ERP project; and
associate the workflow data about execution of the first deliverable with the at least one data object included in the selected activity template.

7. The method of claim 1, further comprising:
receiving user input for adjusting parameters of the requirements data; and
automatically configuring the selected activity template to generate deliverables that define activities for executing the first ERP project based on the received user input for adjusting the parameters of the requirements data.

8. The method of claim 1, wherein the asset repository includes a central database and a project database that interact to form a unified data model, and wherein:
the central database is configured to store the plurality of activity templates and data objects for each of the plurality of activity templates; and
the project database is configured to:
store a plurality of project templates; and
access data related to execution of activities corresponding to deliverables of projects.

9. The method of claim 1, wherein identifying the plurality of activity templates comprises:
determining that a request for accessing the asset repository has been received by the system;
deleting, from activity templates in the asset repository, references to project-specific workflow data; and
identifying a subset of activity templates for which the references to the project-specific workflow data have been deleted.

10. The method of claim 1, wherein the selected activity template is configured for modification based on the requirements data.

11. The method of claim 1, further comprising:
modifying, at the asset repository, the selected activity template based on the requirements data; and
storing, in the asset repository, the selected activity template that has been modified based on the requirements data.

12. The method of claim 1, wherein:
the at least one data object of the selected activity template includes a plurality of data objects that are dynamically linked to each other in the selected activity template; and
at least one data object of the plurality of data objects corresponds to one or more of a plurality of phases of the first ERP project.

13. The method of claim 12, wherein the one or more of the plurality of phases of the first ERP project include at least one of: a planning phase, an analysis phase, a design phase, a build phase, a test phase, and a deploy phase.

14. A system comprising:
one or more processing devices; and
one or more non-transitory machine-readable storage devices storing instructions that are executable by the one or more processing devices to cause performance of operations comprising:
receiving, at a production platform of the system, requirements data for a first enterprise resource planning (ERP) project;
identifying, based on the requirements data, a plurality of activity templates stored in an asset repository that obtains project feedback output from the production platform, wherein each activity template of the plurality of activity templates includes at least one data object, each data object being linked to a reference template stored in the asset repository;
selecting an activity template from the plurality of activity templates based on input that validates use of the selected activity template to execute activities corresponding to deliverables of the first ERP project;
generating, using the production platform and the selected activity template, a first deliverable for performing the first ERP project;
generating, by the production platform during performance of the first ERP project, workflow data for at least one data object included in the selected activity template, the workflow data comprising feedback about execution of activities corresponding to the first deliverable;
generating modified reference templates by modifying, at the asset repository, characteristics of at least one reference template based on the workflow data generated for the at least one data object included in the selected activity template; and
using one or more of the enhanced activity modified reference templates to generate a second deliverable for performing a second ERP project.

15. One or more non-transitory machine-readable storage devices storing instructions that are executable by one or more processing devices to cause performance of operations comprising:
receiving, at a production platform of a system, requirements data for a first enterprise resource planning (ERP) project;
identifying, based on the requirements data, a plurality of activity templates stored in an asset repository that obtains project feedback output from the production platform, wherein each activity template of the plurality of activity templates includes at least one data object, each data object being linked to a reference template stored in the asset repository;
selecting an activity template from the plurality of activity templates based on input that validates use of the selected activity template to execute activities corresponding to deliverables of the first ERP project;
generating, using the production platform and the selected activity template, a first deliverable for performing the first ERP project;
generating, by the production platform during performance of the first ERP project, workflow data for at least one data object included in the selected activity template, the workflow data comprising feedback about execution of activities corresponding to the first deliverable;
generating modified reference templates by modifying, at the asset repository, characteristics of at least one reference template based on the workflow data generated for the at least one data object included in the selected activity template; and
using one or more of the modified reference templates to generate a second deliverable for performing a second ERP project.

16. The method of claim 1, wherein the at least one reference template includes baseline information of digital assets of the system.

17. The method of claim 1, wherein generating the workflow data for the at least one data object comprises:
- extracting, from a set of data related to execution of activities corresponding to a plurality of deliverables, data comprising feedback about execution of activities corresponding to the first deliverable; and
- sanitizing the extracted data by removing sensitive information from the extracted data.

18. The method of claim 1, wherein identifying the plurality of activity templates comprises determining that each of the plurality of activity templates includes a project identifier linking to a project template representing the first ERP project.

19. The method of claim 8, comprising:
- storing the selected activity template at the project database during performance of the first ERP project; and
- modifying, at the central database, characteristics of the at least one reference template based on changes made to the selected activity template stored at the project database.

20. The method of claim 8, comprising:
- accessing the project database to obtain a project template for the first ERP project; and
- generating the first deliverable for performing the first ERP project based on (i) the selected activity template and (ii) the project template for the first ERP project.

* * * * *

UNITED STATES PATENT AND TRADEMARK OFFICE
CERTIFICATE OF CORRECTION

PATENT NO. : 11,449,813 B2
APPLICATION NO. : 15/952491
DATED : September 20, 2022
INVENTOR(S) : Antoine Sebilleau, Pak Ming Wan and Michel Etienne Liegard

Page 1 of 1

It is certified that error appears in the above-identified patent and that said Letters Patent is hereby corrected as shown below:

In the Claims

In Claim 14, Column 20, Line 27, after "the" delete "enhanced activity".

Signed and Sealed this
Eighth Day of November, 2022

Katherine Kelly Vidal
*Director of the United States Patent and Trademark Office*